(12) United States Patent
Golubitsky et al.

(10) Patent No.: US 10,999,467 B2
(45) Date of Patent: May 4, 2021

(54) CONTEXT-ADAPTIVE SCANNING

(71) Applicant: Google LLC, Mountain View, CA (US)

(72) Inventors: Oleg Golubitsky, Guelph (CA); Dake He, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/885,383

(22) Filed: May 28, 2020

(65) Prior Publication Data

US 2020/0358922 A1  Nov. 12, 2020

Related U.S. Application Data

(63) Continuation of application No. 16/408,126, filed on May 9, 2019, now Pat. No. 10,701,238.

(51) Int. Cl.
*H04N 1/32* (2006.01)
*H04N 1/00* (2006.01)

(52) U.S. Cl.
CPC ..... *H04N 1/32619* (2013.01); *H04N 1/00798* (2013.01); *H04N 1/00954* (2013.01)

(58) Field of Classification Search
None
See application file for complete search history.

(56) References Cited

U.S. PATENT DOCUMENTS

| | | | | |
|---|---|---|---|---|
| 6,735,700 B1 ‡ | 5/2004 | Flint | ...................... | G06F 21/56 |
| | | | | 713/188 |
| 7,836,502 B1 ‡ | 11/2010 | Zhao | ................... | H04L 63/1416 |
| | | | | 726/22 |
| 8,359,651 B1 ‡ | 1/2013 | Wu | ...................... | G06F 16/9535 |
| | | | | 726/25 |
| 2009/0013031 A1 ‡ | 1/2009 | Nolet | ...................... | G06Q 30/02 |
| | | | | 709/20 |
| 2013/0226897 A1 ‡ | 8/2013 | Carver | .................. | G06F 16/951 |
| | | | | 707/70 |

OTHER PUBLICATIONS

PCT International Search Report and Written Opinion in International Application No. PCT/US2019/060531, dated Mar. 18, 2020, 13 pages.‡

‡ imported from a related application

*Primary Examiner* — Lennin R RodriguezGonzalez
(74) *Attorney, Agent, or Firm* — Fish & Richardson P.C.

(57) ABSTRACT

Methods, systems, and apparatus, including computer programs encoded on a computer storage medium, for context-adaptive scanning of digital components. In one aspect, a method comprises: selecting a given digital component from among a plurality of digital components based on a current scanning priority of the given digital component; scanning the given digital component, comprising determining a current state of the given digital component; determining a current context of the given digital component based on one or more of: (i) the current state of the given digital component, or (ii) a current scan index of the given digital component that specifies a number of times the given digital component has been scanned; determining an updated scanning priority of the given digital component based on the current context of the given digital component; and re-scanning the given digital component according to the updated scanning priority.

20 Claims, 6 Drawing Sheets

CONTEXT-ADAPTIVE SCANNING

CROSS-REFERENCE TO RELATED APPLICATION

This patent application is a continuation (and claims the benefit of priority under 35 USC 120) of U.S. patent application Ser. No. 16/408,126, filed May 9, 2019. The disclosure of the prior application is considered part of (and is incorporated by reference in) the disclosure of this application.

BACKGROUND

This specification relates to adaptive scanning techniques.

Digital components are discrete units of digital content or digital information, which can be incorporated into various electronic documents or applications. A digital component can be scanned to determine the state of the digital component, e.g., the compliance status of the digital component. The compliance status of a digital component specifies whether the digital component complies with one or more policy criteria. For example, a digital component that includes an active link that redirects a client device to a specific network address (or series of network addresses) may be determined to comply with certain policy criteria only if the network address(es) do not host malware, or otherwise result in an action that violates the policy criteria (e.g., by initiating a malicious script or set of operations that negatively impact performance of a client device).

SUMMARY

This specification describes a system implemented as computer programs on one or more computers in one or more locations that performs context-adaptive scanning, which is also referred to as scan scheduling, or simply scanning.

According to a first aspect there is provided a method that includes selecting a given digital component from among a set of digital components. Each digital component in the set of digital components has a current scanning priority that defines a current priority for scanning the digital component. The given digital component is selected based on the current scanning priority of the given digital component.

The given digital component is scanned, including determining a current state of the given digital component. The current state of the given digital component defines a current compliance status of the given digital component that specifies whether the given digital component currently complies with a policy criterion. A current context of the given digital component is determined based on one or more of: (i) the current state of the given digital component, or (ii) a current scan index of the given digital component that specifies a number of times the given digital component has been scanned.

An updated scanning priority of the given digital component is determined based on the current context of the given digital component. The given digital component is re-scanned according to the updated scanning priority.

In some implementations, the current context of the given digital component is additionally based on one or more of: a number of times that the given digital component has been transmitted for presentation with electronic documents at user devices, and which electronic documents the given digital component has been presented with at the user devices.

In some implementations, the given digital component specifies a landing page, and scanning the given digital component comprises determining whether the landing page hosts malware.

In some implementations, the updated scanning priority of the given digital component specifies a waiting time until the given digital component is next scanned.

In some implementations, determining an updated scanning priority of the given digital component based on the current context of the given digital component includes using a mapping function to map the current context of the given digital component to data defining the updated scanning priority of the given digital component. For each of multiple possible current contexts, the mapping function defines a mapping from the possible current context to data defining a corresponding scanning priority.

In some implementations, the data defining the updated scanning priority of the given digital component includes a scaling factor. Determining the updated scanning priority of the given digital component based on the current context of the given digital component further includes: identifying a default scanning priority of the given digital component, and determining the updated scanning priority of the given digital component as a function of the default scanning priority of the given digital component and the scaling factor.

In some implementations, the function of the default scanning priority of the given digital component and the scaling factor comprises a product of the default scanning priority of the given digital component and the scaling factor.

In some implementations, the mapping function maps the current context of the given digital component to data defining the updated scanning priority of the given digital component based on how frequently the state of the given digital component is predicted to change.

In some implementations, how frequently the state of the given digital component is predicted to change is determined by processing logged data that characterizes, for each of multiple particular digital components: when the particular digital component was scanned, the state of the particular digital component when it was scanned, and the context of the particular digital component when it was scanned.

In some implementations, the mapping function maps the current context of the given digital component to data defining the updated scanning priority of the given digital component using a likelihood that, based on the current context of the given digital component, the state of the given digital component will change before a next time the given digital component is scanned.

In some implementations, the mapping function is determined using a local transition probability distribution.

According to a second aspect, there are provided one or more non-transitory computer storage media storing instructions that when executed by one or more computers cause the one or more computers to perform operations including operations implementing the method of the first aspect.

According to a third aspect, there is provided a system including: one or more computers; and one or more storage devices communicatively coupled to the one or more computers, where the one or more storage devices store instructions that, when executed by the one or more computers, cause the one or more computers to perform operations including operations implementing the method of the first aspect.

Particular embodiments of the subject matter described in this specification can be implemented so as to realize one or more of the following advantages.

The dynamic scanning techniques described in this specification can more efficiently scan digital components than some conventional scanning systems, e.g., conventional systems that simply scan on a fixed schedule. That is, the system described in this specification can dynamically schedule and perform scans in a manner that enables changes in the state (e.g., compliance status) of digital components to be detected at least as rapidly (e.g., on average) as some conventional systems, while performing fewer total scans than the conventional systems. Thus, the disclosed scanning techniques enable the system described in this specification to consume fewer resources (e.g., computational resources) performing scans than conventional systems (e.g., that simply scan according to a fixed schedule), while detecting changes in the state of digital components at least as rapidly as the conventional systems.

As described in more detail throughout this document, the disclosed scanning techniques take into account contextual information for determining when a digital component or another item should be scanned and/or rescanned. As such, the techniques described herein need not waste resources to perform a scan of the particular digital component or other item unless the contextual information indicates that the scan is needed. The resources saved by reducing the number of scans required can be allocated to other tasks, thereby reducing the overall number of processing resources, which leads to a more efficient system. Furthermore, the techniques described herein also prevent the distribution of malicious digital components that can negatively affect the performance of client devices that would otherwise receive the malicious digital components, such that the use of the techniques described herein also improve the performance of client devices.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a scanning system that dynamically determines when digital components are scanned. Each time a digital component is scanned, the scanning system determines a scanning priority that characterizes how soon the digital component should be re-scanned, e.g., a waiting time until the digital component is re-scanned, and then performs a subsequent scan based upon the scanning priority.

As used throughout this document the phrase digital components refers to discrete units of digital content or digital information that can include one or more of, e.g., video clips, audio clips, multimedia clips, images, text segments, or uniform resource locators (URLs). A digital component can be electronically stored in a physical memory device as a single file or in a collection of files, and digital components can take the form of video files, audio files, multimedia files, image files, or text files and include streaming video, streaming audio, social network posts, blog posts, and/or advertising information, such that an advertisement is a type of digital component. Generally, a digital component is defined by (or provided by) a single provider or source (e.g., an advertiser, publisher, or other content provider), but a digital component provided from one source could be enhanced with data from another source (e.g., weather information, real time event information, or other information obtained from another source).

As used throughout this document, scanning a digital component refers to determining a state of the digital component, e.g., whether the digital component complies with one or more policy criteria. For example, scanning a digital component may refer to determining whether a landing page corresponding to a URL included in the digital component hosts malware (e.g., viruses). In this example, the policy criteria may specify that the digital component is "compliant" (i.e., complies with the policy criteria) only if the landing page does not host malware. Landing pages are used for purposes of example, but the scanning of a digital component can include an evaluation of (e.g., scanning of) the digital component itself and/or any network location that is referenced by or linked to by the digital component. For example, user interaction with a particular digital component may cause a client device to engage in a series of redirects to multiple network locations. In this example, scanning of the digital component could include an evaluation of the digital component itself and/or any of the network locations in the series of redirects.

Generally, the state of a digital component can change over time. In one example, a digital component that is initially compliant may become non-compliant for a period of time before eventually reverting back to being compliant again.

The scanning system attempts to schedule scans efficiently, that is, in a manner that enables changes in the state of digital components to be detected quickly while minimizing the number of scans that are performed, so as to reduce the amount of computing resources required to scan digital components. To this end, after a digital component is scanned, the scanning system adaptively determines the scanning priority for the digital component based on the current "context" of the digital component.

The context of a digital component can refer to any sort of data that is correlated with how quickly the state of the digital component is predicted to change (e.g., based on an analysis of logged scan scheduling data). For example, the current context of a digital component may be based on the current state of the digital component, the current scan index of the digital component (i.e., the number of times the digital component has been scanned), statistics derived from the history or a windowed history of available scan results (e.g. the number of compliant and non-compliant scan results in a given window of time), or a combination thereof.

Generally, the scanning system can determine a higher scanning priority (e.g., a shorter waiting time until being re-scanned) for digital components with a current context that is correlated with more rapid changes in state. Similarly, the scanning system can determine a lower scanning priority (e.g., a longer waiting time until being re-scanned) for digital components with a current context that is correlated with slower changes in state.

These features and other features are described in more detail below.

Figure 1:
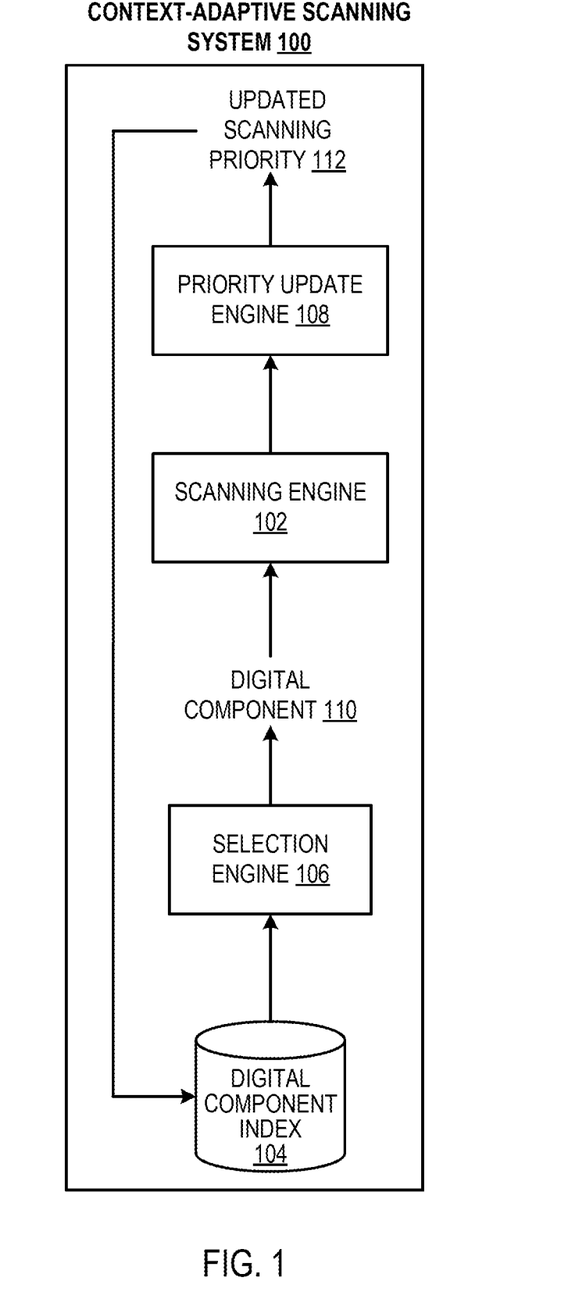
FIG. 1 shows an example context-adaptive scanning system.

FIG. 1 shows an example context-adaptive scanning system 100. The context-adaptive scanning system 100 is an example of a system implemented as computer programs on one or more computers in one or more locations in which the systems, components, and techniques described below are implemented.

The context-adaptive scanning system 100 is configured to adaptively schedule scans for digital components indexed by a digital component index 104.

For each of multiple digital components, the digital component index 104 includes data specifying: (i) the digital component, and (ii) a current scanning priority that characterizes how soon the digital component should be re-scanned. The data specifying the digital component may be, e.g., a pointer to a memory location storing the digital component. The data specifying the current scanning priority may be, e.g., a waiting time until the digital component is re-scanned, or a unitless numerical priority value (e.g., a number between 1 and 10). The system 100 can maintain the digital component index 104 in any of a variety of places, for example, in a physical data storage device or a logical data storage area (e.g., in a cloud computing environment).

This specification primarily describes the scanning system 100 with reference to scanning of digital components. In some implementations, rather than scanning digital components, the system 100 may be configured to scan physical items, e.g., devices (smoke alarms or cars), or structures (e.g., bridges). A few examples of scanning physical items are described in more detail below.

The system 100 includes a selection engine 106, a scanning engine 102, and a priority update engine 108.

The selection engine 106 is configured to select digital components indexed by the digital component index 104 for scanning based on their respective current scanning priorities. For example, the selection engine 106 may select a digital component for scanning when the waiting time until the digital component should be re-scanned has elapsed. As another example, the selection engine 106 may continuously select digital components with the highest priority values for scanning.

In some cases, the digital component index 104 defines a grouping of the digital components into different categories, and the selection engine 106 may select digital components for scanning based on the categories as well as on the current scanning priorities. In one example, the digital component index 104 may group the digital components into three categories: (i) digital components that have not yet been scanned, (ii) digital components that have been the subject of one or more recent user complaints, and (iii) digital components that have been scanned and have not been the subject of recent user complaints. In this example, the selection engine 106 may prioritize digital components in the first or second categories (i.e., digital components that have not yet been scanned or that are the subject of recent user complaints) for scanning over the remaining digital components, regardless of the current scanning priorities.

A user can make a complaint about a digital component in any of variety of ways. For example, a user can make a complaint about a digital component that is presented on a device of the user by interacting with an element (e.g., button) included in the digital component that enables the user to flag the digital component as being non-compliant.

The scanning engine 102 is configured to scan the digital components selected for scanning by the selection engine 106. Scanning a digital component refers to determining the state of the digital component (from multiple possible states of the digital component), e.g., whether the digital component complies with one or more policy criteria. For example, scanning a digital component may refer to determining whether a landing page (or any other network location) corresponding to a URL included in the digital component hosts malware (e.g., viruses), determining whether the digital component includes inappropriate (e.g., offensive or illegal) content, or both. In this example, the digital component may be determined to be compliant only if the landing page does not host malware and the digital component does not include inappropriate content.

In one example, the system 100 may scan a digital component using an automated scanning technique that analyzes the content of a digital component to determine whether the digital component is compliant with the policy criteria. The automated scanning technique may include processing text, image, or video data included in the digital component using a classification model that is configured to generate an output characterizing whether the text, image, or video data is inappropriate. The automated scanning technique may also include processing Hypertext Markup Language (HTML) code specifying the contents of a landing page corresponding to a URL included in the digital component using a classification model that is configured to generate an output characterizing whether the landing page includes malware. The classification models may be trained using supervised or unsupervised machine learning techniques.

As described earlier, the system 100 can be configured to scan physical items (e.g., devices or structures). Scanning a device or a structure may refer to, e.g., determining a physical condition of the device or structure (e.g., whether the device or structure is rusted or otherwise in poor condition). In this example, the device or structure may be determined to be compliant only if the physical condition of the device or structure enables it to operate safely. The scanning engine 102 may scan a device or structure by generating a request for a maintenance technician to inspect the device or structure.

The priority update engine 108 is configured to determine an updated scanning priority 112 for digital components scanned by the scanning engine 102. The updated scanning priority 112 characterizes how soon the digital component should be re-scanned. To determine the updated scanning priority for a digital component, the priority update engine 108 determines a current "context" of the digital component, and then uses a mapping function to map the current context to data defining the updated scanning priority for the digital component. A few examples of determining the current context of a digital component follow.

In one example, the system can determine the current context of a digital component based on one or more of: the current compliance status of the digital component, the current scan index of the digital component (i.e., specifying how many times the digital component has been scanned), the duration of time since the digital component was first scanned, a number of times that the digital component has been transmitted for presentation with electronic documents at user devices by a digital component distribution system (e.g., as described with reference to FIG. 5), which electronic documents the digital component has been presented with at the user devices, characteristics of the user devices where the digital component has been presented (e.g., operating system, browser type, and computing platform, e.g., desktop or mobile), the computational complexity (e.g., processing time) of scanning the digital component, and the geographical location (e.g, of the data center) that last scanned the digital component.

In another example, the system can determine the current context of a device or structure based on one or more of: how frequently the device or structure is used (e.g., a number of miles travelled by a car or the number of vehicles that have crossed a bridge), and weather conditions to which the device or structure is currently exposed (e.g., snow or rain).

The priority update engine 108 can represent the current context of a digital component in any of a variety of ways, e.g., as an ordered collection of numerical values, such as a vector or matrix of numerical values. In one example, the priority update engine 108 can represent the current context of a digital component as a vector with two components: a first component that can assume values in the set {0,1} and that defines the current compliance status of the digital component, and a second component that can assume non-negative integer values and that defines the current scan index of the digital component.

For each of multiple possible current contexts, the mapping function used by the priority update engine 108 (referred to in this specification as the "priority mapping function") defines a mapping from the possible current context to data defining a corresponding scanning priority. A few examples follow.

In one example, the priority mapping function defines a mapping from each possible current context to data that directly defines a corresponding scanning priority, e.g., a waiting time until a digital component should be re-scanned.

In another example, the priority mapping function defines a mapping from each possible current context to data defining a scaling factor that, when combined with (e.g., multiplied by) a default scanning priority for a digital component, defines the corresponding updated scanning priority for the digital component. The default scanning priority for a digital component refers to a scanning priority generated by a "default" scheduling system. For example, the updated scanning priority for a digital component x having current context k may be given by:

$$t'(x)=t(x)\cdot \alpha_k \quad (1)$$

where t'(x) is the waiting time until digital component x is re-scanned, t(x) is the default waiting time for digital component x, and $\alpha_k$ is the scaling factor corresponding to context k (i.e., as specified by the priority mapping function). The scaling factors can be understood as defining adjustments to the default scanning priorities generated by the default scheduling system that enables scans to be scheduled more efficiently. Examples of scaling factors are described below with reference to equations (2), (3), (4), and (5).

The default scheduling system can determine the default scanning priority for a digital component in any of a variety of ways. In one example, the default scheduling system can determine default scanning priorities that cause digital components to be re-scanned on a fixed schedule, e.g., once per hour, or once per day. In another example, the default scheduling system can determine the default scanning priority for a digital component based on how frequently a digital component distribution system transmits the digital component for presentation with electronic documents at user devices.

Figure 2:
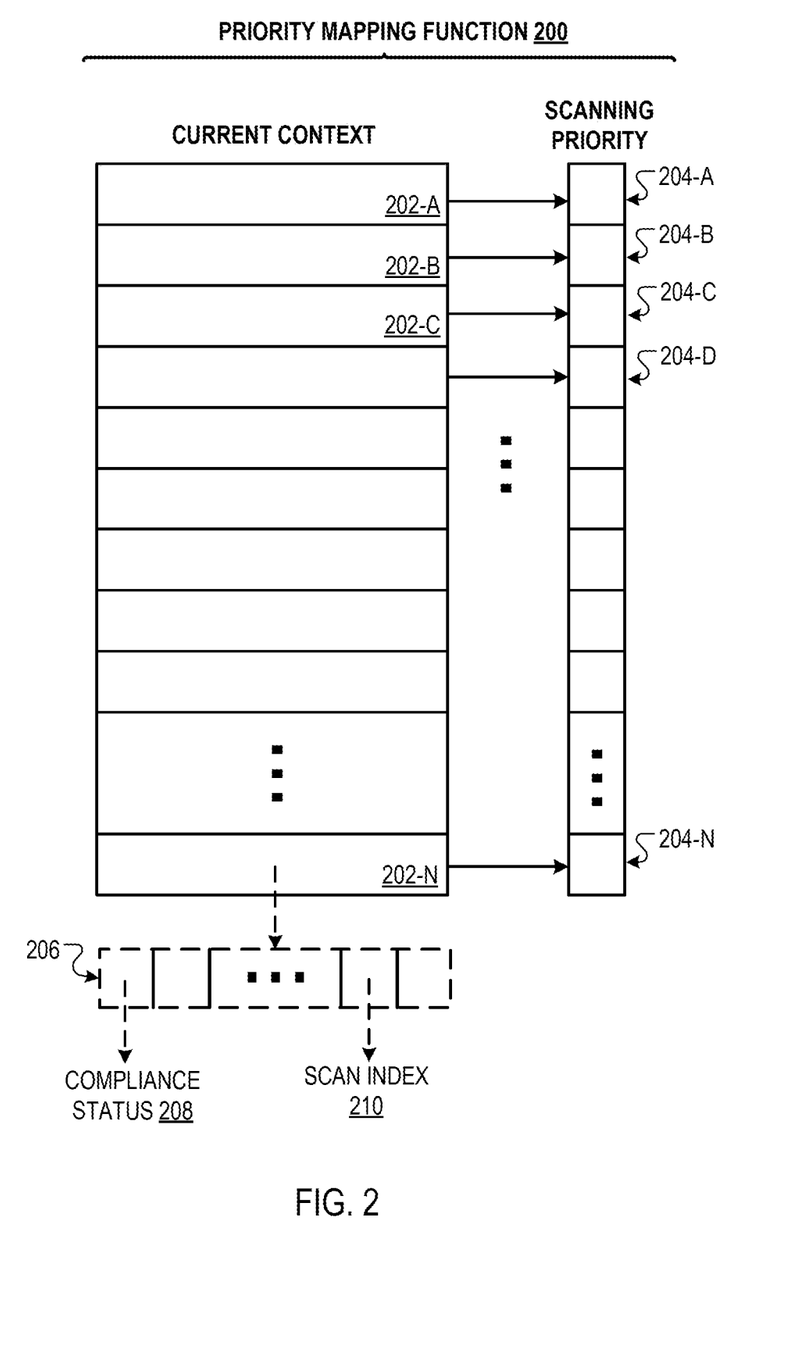
FIG. 2 is an illustration of an example priority mapping function.

FIG. 2 is an illustration of an example priority mapping function 200. The priority mapping function 200 defines a mapping from each of multiple possible current contexts 202-A-202-N to data defining a corresponding scanning priority 204-A-204-N. In this example, each possible current context of a digital component is represented as a vector 206 that includes: (i) a current compliance status 208 of the digital component, and (ii) a current scan index 210 of the digital component.

The priority mapping function can be determined by analyzing logged data that characterizes the scanning history of a set of digital components. For each digital component, the logged data records: when the digital component was scanned, the respective state (e.g., compliance status) of the digital component each time it was scanned, and the respective context of the digital component each time it was scanned.

Broadly, the priority mapping function can map contexts that are correlated with more rapid changes in state (i.e., in the logged data) to higher scanning priorities (e.g., shorter waiting times until being re-scanned). Similarly, the priority mapping function can map contexts that are correlated with slower changes in state to lower scanning priorities (e.g., longer waiting times until being re-scanned). For example, the priority mapping function can map contexts to scanning priorities in a manner that causes the likelihood that the state of a digital component will change before the next time the digital component is scanned to be the same for each possible context of the digital component.

A few example priority mapping functions are described next.

In one example, the possible current contexts may be indexed by variable k and may assume M≥1 distinct values, and the priority mapping function may map the current context k to a corresponding scaling factor $\alpha_k$ given by:

$$\alpha_k = \frac{1}{q_k} \sqrt{\frac{\sum_{m=0}^{M-1} p_m q_m}{\sum_{m=0}^{M-1} \left(\frac{p_m}{q_m}\right)}} \quad (2)$$

where $q_k$ represents the "cross-over" probability (likelihood) that the state (e.g., compliance status) of the digital component will change between the current scan and the next scan of the digital component if the current context of the digital component is k, and $p_m$ represents the "context" probability that the value of the current context of the digital component is m.

In a particular example of equation (2), the current context of a digital component may be defined by a two dimensional vector [i, j]. The first component i of the vector is a non-negative integer value that represents the current scan index of the digital component. The second component j of the vector is a binary value that indicates the current compliance status of the digital component (e.g., where 0 indicates non-compliance and 1 indicates compliance). The priority mapping function may map the context [i, j] to a corresponding scaling factor $\alpha_{i,j}$ given by:

$$\alpha_{i,j} = \begin{cases} \dfrac{1}{q_i(1|0)}\sqrt{\dfrac{p_i(0)q_i(1|0) + p_i(1)q_i(0|1)}{\dfrac{p_i(0)}{q_i(1|0)} + \dfrac{p_i(1)}{q_i(0|1)}}} & \text{if } j = 0 \\ \dfrac{1}{q_i(0|1)}\sqrt{\dfrac{p_i(0)q_i(1|0) + p_i(1)q_i(0|1)}{\dfrac{p_i(0)}{q_i(1|0)} + \dfrac{p_i(1)}{q_i(0|1)}}} & \text{if } j = 1 \end{cases} \quad (3)$$

where $q_i(1|0)$ represents the cross-over probability that a digital component that is not compliant at scan index i will be compliant at scan index i+1, $q_i(0|1)$ represents the cross-over probability that a digital component that is compliant at scan index i will not be compliant at scan index i+1, $p_i(0)$ represents the probability that digital components are not compliant at scan index i, and $p_i(1)$ represents the probability that digital components are compliant at scan index i.

In certain situations, rapid detection of a change in compliance status from "compliant" to "non-compliant" may be more important than rapid detection of a change in compliance status from "non-compliant" to "compliant". The priority mapping function defined by equation (3) can be adjusted to include weighting factors $w_0$ and $w_1$, where $w_0$ is a non-negative number indicating the importance of detecting a change in compliance status from "not-compliant" to "compliant", $w_1$ is a non-negative number indicating the importance of detecting a change in compliance status from "compliant" to "not-compliant", and the priority mapping function is given by:

$$\alpha_{i,j} = \begin{cases} \dfrac{1}{w_0 q_i(1|0)}\sqrt{\dfrac{p_i(0)w_0 q_i(1|0) + p_i(1)w_1 q_i(0|1)}{\dfrac{p_i(0)}{w_0 q_i(1|0)} + \dfrac{p_i(1)}{w_1 q_i(0|1)}}} & \text{if } j = 0 \\ \dfrac{1}{w_1 q(0|1)}\sqrt{\dfrac{p_i(0)w_0 q_i(1|0) + p_i(1)w_1 q_i(0|1)}{\dfrac{p_i(0)}{w_0 q_i(1|0)} + \dfrac{p_i(1)}{w_1 q_i(0|1)}}} & \text{if } j = 1 \end{cases} \quad (4)$$

where the variables in equation (4) are defined in the same manner as for equation (3).

The cross-over probabilities and context probabilities that are used to define the priority mapping functions described with reference to equations (2), (3), and (4) can be determined by analyzing the logged data. For example, the cross-over probability $q_i(1|0)$ can be determined as a ratio of: (i) the number of times that digital components transitioned from being non-compliant to being compliant from scan index i to scan index i+1, and (ii) the number of times that digital components were scanned and determined to be non-compliant at scan index i. Similarly, the cross-over probability $q_i(0|1)$ can be determined as a ratio of: (i) the number of times that digital components transitioned from being compliant to being non-compliant from scan index i to scan index i+1, and (ii) the number of times that digital components were scanned and determined to be compliant at scan index i. The non-compliance probability $p_i(0)$ can be determined as a ratio of: (i) the number of times that digital components were scanned and determined to be non-compliant at scan index i, and (ii) the number of digital components were scanned at least i times. The compliance probability $p_i(1)$ can be determined as a ratio of: (i) the number of times that digital components were scanned and determined to be compliant at scan index i, and (ii) the number of digital components that were scanned at least i times.

In another example of a priority mapping function, the possible current contexts may be represented by scan index i, and the priority mapping function may map the current context i to a corresponding scaling factor $\alpha_i$ given by:

$$\alpha_i = \sqrt{\dfrac{\sum_{n=1}^{N-1} U_n}{\sum_{n=1}^{N-1} \left(\dfrac{T_n^2}{U_n}\right)}} \cdot \dfrac{T_i}{U_i} \quad (5)$$

where $U_i$ is the sum of the durations of time that elapsed between scan i and scan i+1 for each digital component in the logged data for which the compliance status of the digital component changed from scan i to scan i+1, $T_i$ is the sum of the durations of time that elapsed between scan i and scan i+1 for each digital component in the logged data, and N is a maximum scan index.

In another example of a priority mapping function, the possible current contexts of a digital component may be indexed by a scan index i, and the priority mapping function may map the scan index i to a corresponding waiting time until the digital component should be scanned again after scan index i. In this example, the priority mapping function may be determined using a "local transition" probability distribution.

Figure 3:
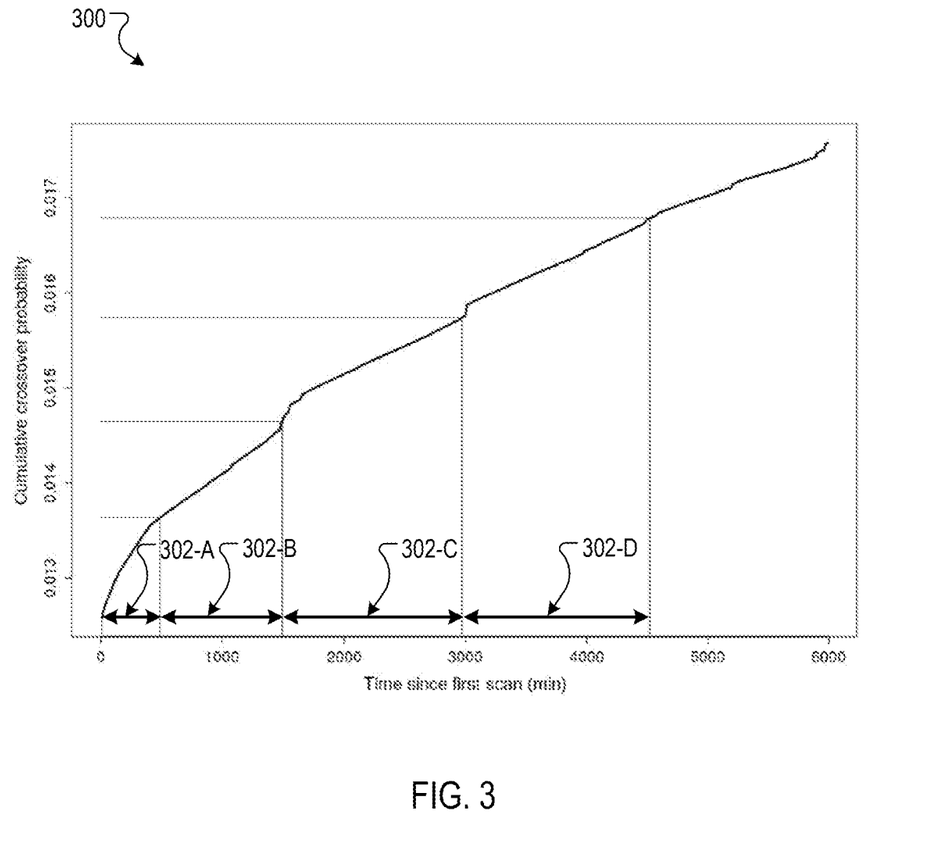
FIG. 3 is an illustration of a cumulative distribution function (CDF) of an example local transition probability distribution.

A local transition probability distribution defines, for each of multiple times since a digital component is first scanned, a respective probability that the state (e.g., compliance status) of the digital component will change at (or within a unit duration of time around) that time. An example of a cumulative distribution function (CDF) of a local transition probability distribution is illustrated by FIG. 3. The horizontal axis of the graph 300 represents the time since the first scan of a digital component, and the vertical axis represents the cumulative probability of a change in state. That is, the height of the graph 300 at a particular time since the first scan indicates the probability that the state of a digital component will change one or more times before the particular time since the first scan has elapsed.

The priority mapping function can be determined by using the local transition probability distribution to identify a partition of a duration of time $[0, T_{max}]$ into non-overlapping intervals, where the probability that the state of a digital component will change in each of the intervals is the same (or within an appropriate tolerance range). The probability that the state of a digital component will change in an interval [a, b] can be determined as P(b)−P(a), where P(·) is the CDF of the local transition probability distribution.

After identifying the intervals, the priority mapping function can be specified as mapping each scan index to a waiting time given by the duration of time of a corresponding interval. In the example depicted in FIG. 3, the priority mapping function may map scan index i=1 to the duration of time corresponding to interval 302-A, scan index i=2 to the duration of time corresponding to interval 302-B, scan index i=3 to the duration of time corresponding to interval 302-C, and scan index i=4 to the duration of time corresponding to interval 302-D.

A local transition probability distribution can be determined by processing the logged data. For example, the probability p(t) that the state of a digital component will change at (or within a unit duration of time around) a particular time t since the first scan can be determined as:

$$p(t) = \frac{1}{|C_t|} \cdot \sum_{x \in D_t} \frac{1}{b(x) - a(x)} \quad (6)$$

where $|C_t|$ is the number of digital components in the logged data were scanned both before and after time t, $D_t$ is the set of digital components x in the logged data that changed state between the scan immediately before time t and the scan immediately after time t, b(x) represents the time at which the scan that occurred immediately after time t for digital component x occurred, and a(x) represents the time at which the scan that occurred immediately before time t for digital component x occurred.

The priority mapping function that is determined based on the local transition probability distribution (as described above) depends on the number of intervals into which the duration of time $[0, T_{max}]$ is partitioned. To identify an appropriate (e.g., optimal) number of intervals, the duration of time $[0, T_{max}]$ can be partitioned into K intervals (as described earlier) for each $K \in \{1, \ldots, K_{max}\}$ where $K_{max}$ is a positive integer, and a respective "undetermined time" can be determined for each K as:

$$U_K = \sum_{k=1}^{K} (P(b_k) - P(a_k)) \cdot N_{a_k} \quad (7)$$

where the k-th interval is given by $[a_k, b_k]$, $P(\cdot)$ is the CDF of the local transition probability distribution, and $N_{a_k}$ is the number of digital components (i.e., in the logged data) that are scanned after time $a_k$. The undetermined time $U_K$ is an estimate of the total duration of time that would have elapsed between consecutive scans of digital components where the state of the digital component changed between the consecutive scans if the scans had been scheduled using the priority mapping function corresponding to a partition into K intervals. The original undetermined time $U_0$ (i.e., corresponding to the original scheduling of the scans of the digital components in the logged data) can be determined by summing the durations of time that elapse between consecutive scans where the state of the digital component changed between the consecutive scans. The number of intervals to be used in determining the priority mapping function can be identified as the smallest K having a corresponding undetermined time $U_K$ that is less than the original undetermined time $U_0$.

Figure 4:
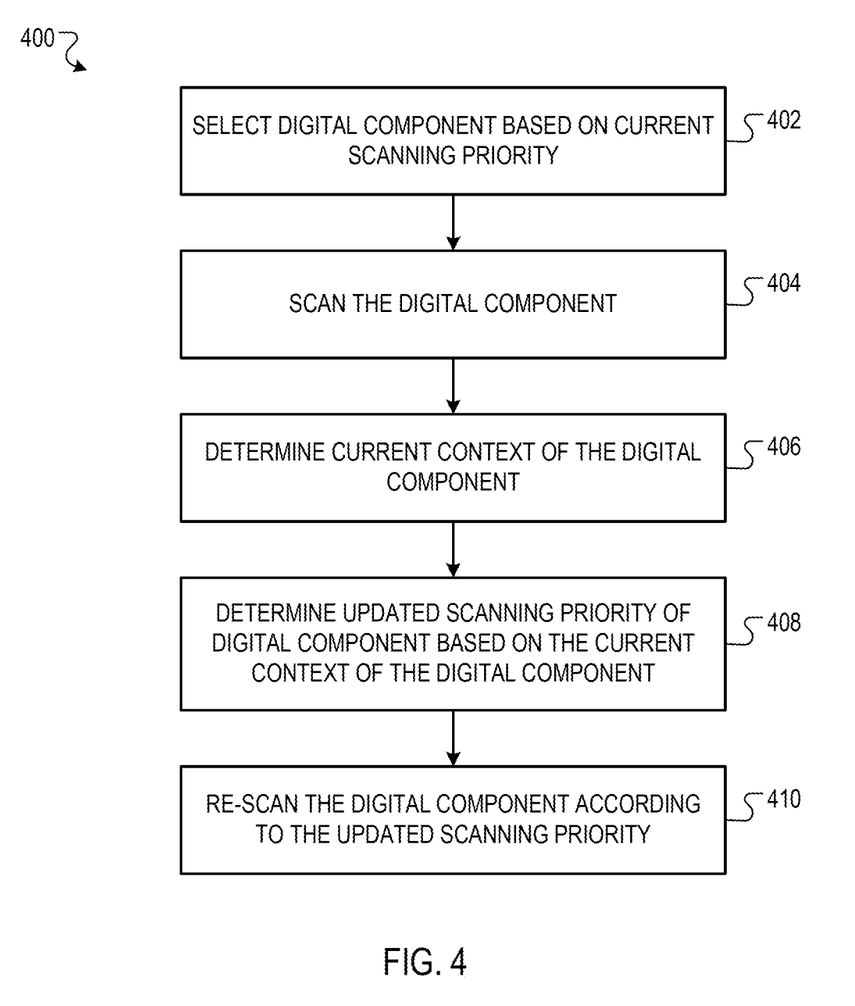
FIG. 4 is a flow diagram of an example process for scanning a digital component.

FIG. 4 is a flow diagram of an example process 400 for scanning a digital component. For convenience, the process 400 will be described as being performed by a system of one or more computers located in one or more locations. For example, a context-adaptive scanning system, e.g., the context-adaptive scanning system 100 of FIG. 1, appropriately programmed in accordance with this specification, can perform the process 400.

The system selects a digital component for scanning from among a set of digital components that each have a current scanning priority (402). The system selects the digital component based on the current scanning priority of the digital component. The current scanning priority of a digital component may specify, e.g., a waiting time until the digital component is next scanned.

The system scans the digital component, including determining the state of the digital component (404). The state of the digital component may specify the compliance status of the digital component, that is, whether the digital component complies with one or more policy criteria. In one example, the digital component specifies a landing page, scanning the digital component includes determining whether the landing page hosts malware, and the digital component is determined to satisfy the policy criteria only if the landing page does not host malware.

The system determines the current context of the digital component (406). The system may determine the current context of a digital component digital component based on one or more of: the current state (e.g., compliance status) of the digital component, the current scan index of the digital component, the number of times that the digital component has been transmitted for presentation with electronic documents at user devices, and which electronic documents the digital component has been presented with at the user devices.

The system determines an updated scanning priority of the digital component based on the current context of the digital component (408). The updated scanning priority of the digital component may specify a waiting time until the digital component is next scanned. The system may determine the updated scanning priority by using a mapping function to map the current context of the digital component to data defining the updated scanning priority of the digital component.

In some implementations, the data defining the updated scanning priority may include a scaling factor, and the system may determine the updated scanning priority of the digital component as a function of: (i) a default scanning priority of the digital component, and (ii) the scaling factor. For example, the function may include a product of the default scanning priority and the scaling factor. The default scanning priority may be determined by a default scheduling system.

The mapping function may map the current context of the digital component to data defining the updated scanning priority of the digital component based on how frequently the state (e.g., compliance status) of the digital component is predicted to change, e.g., based on the "cross-over" probabilities described with reference to equations (2), (3), and (4). The system may determine how frequently the state of the digital component is predicted to change, e.g., as a likelihood that, based on the current context of the digital component, the state of the given digital component will change before a next time the digital component is scanned. The system may also determine the mapping function based on a local transition probability distribution.

To determine the mapping function, the system processes logged data that characterizes: when particular digital components were scanned, the states (e.g., compliance statuses) of the digital components when they were scanned, and the contexts of the digital components when they were scanned.

The system re-scans the digital component according to the updated scanning priority of the digital component (410). In one example, the updated scanning priority for the digital component may specify a duration of time until the digital component is re-scanned, and the system may re-scan the digital component once the duration of time has elapsed.

Figure 5:
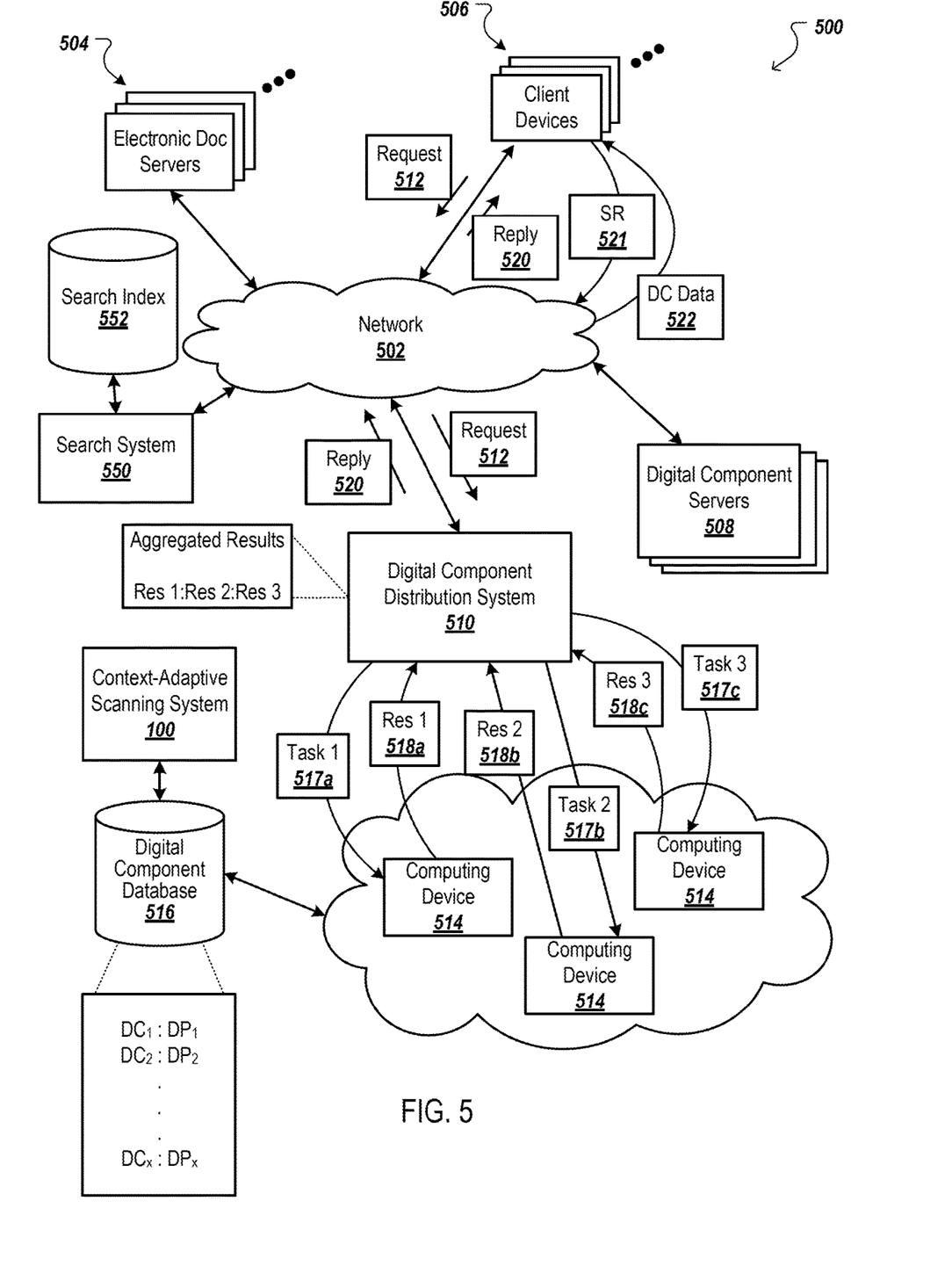
FIG. 5 is a block diagram of an example environment in which a digital component distribution system transmits digital components from a digital component database for presentation with electronic documents.

FIG. 5 is a block diagram of an example environment 500 in which a digital component distribution system 510 transmits digital components from a digital component database 516 for presentation with electronic documents. The context-adaptive scanning system 100 can be used to scan the digital components included in the digital component database 516 to determine whether they comply with one or more policy criteria. A digital component may be identified as not complying with the policy criteria, e.g., if the digital component includes offensive content, or if a landing page specified by the digital component hosts malware. The digital component distribution system 510 may refrain from transmitting digital components that do not comply with the policy criteria.

The example environment 500 includes a network 502, such as a local area network (LAN), a wide area network (WAN), the Internet, or a combination thereof. The network 502 connects electronic document servers 504, client devices 506, digital component servers 508, and a digital component distribution system 510 (also referred to as a "distribution system" 510). The example environment 500 may include many different electronic document servers 504, client devices 506, and digital component servers 508.

A client device 506 is an electronic device that is capable of requesting and receiving resources over the network 502. Example client devices 506 include personal computers, mobile communication devices (e.g., mobile phones), and other devices that can send and receive data over the network 502. A client device 506 typically includes a user application, such as a web browser, to facilitate the sending and receiving of data over the network 502, but native applications executed by the client device 506 can also facilitate the sending and receiving of data over the network 502.

An electronic document is data that presents a set of content at a client device 506. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 506 by electronic document servers 504 ("Electronic Doc Servers"). For example, the electronic document servers 504 can include servers that host publisher websites. In this example, the client device 506 can initiate a request for a given publisher webpage, and the electronic server 504 that hosts the given publisher webpage can respond to the request by sending machine executable instructions that initiate presentation of the given webpage at the client device 506.

In another example, the electronic document servers 504 can include app servers from which client devices 506 can download apps. In this example, the client device 506 can download files required to install an app at the client device 506, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 506 to request content from the data source when the given electronic document is processed (e.g., rendered or executed) by a client device 506. The client device 506 integrates the content obtained from the data source into the given electronic document to create a composite electronic document including the content obtained from the data source.

In some situations, a given electronic document can include one or more digital component tags or digital component scripts that reference the digital component distribution system 510. In these situations, the digital component tags or digital component scripts are executed by the client device 506 when the given electronic document is processed by the client device 506. Execution of the digital component tags or digital component scripts configures the client device 506 to generate a request for one or more digital components 512 (referred to as a "component request"), which is transmitted over the network 502 to the digital component distribution system 510. For example, a digital component tag or digital component script can enable the client device 506 to generate a packetized data request including a header and payload data. The component request 512 can include event data specifying features such as a name (or network location) of a server from which the digital component is being requested, a name (or network location) of the requesting device (e.g., the client device 506), and/or information that the digital component distribution system 510 can use to select one or more digital components provided in response to the request. The component request 512 is transmitted, by the client device 506, over the network 502 (e.g., a telecommunications network) to a server of the digital component distribution system 510.

The component request 512 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 510. Similarly, event data specifying keywords associated with the electronic document ("document keywords") or entities (e.g., people, places, or things) that are referenced by the electronic document can also be included in the component request 512 (e.g., as payload data) and provided to the digital component distribution system 510 to facilitate identification of digital components that are eligible for presentation with the electronic document. The event data can also include a search query that was submitted from the client device 506 to obtain a search results page, and/or data specifying search results and/or textual, audible, or other visual content that is included in the search results.

Component requests 512 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 512 can be transmitted, for example, over a packetized network, and the component requests 512 themselves can be formatted as packetized data having a header and payload data. The header can specify a destination of the packet and the payload data can include any of the information discussed above.

The component distribution system 510 chooses digital components that will be presented with the given electronic document in response to receiving the component request 512 and/or using information included in the component request 512. In some implementations, a digital component is selected (using the techniques described herein) in less than a second to avoid errors that could be caused by delayed selection of the digital component. For example, delays in providing digital components in response to a component request 512 can result in page load errors at the client device 506 or cause portions of the electronic document to remain unpopulated even after other portions of the electronic document are presented at the client device 506. Also, as the delay in providing the digital component to the client device 506 increases, it is more likely that the electronic document will no longer be presented at the client device 506 when the digital component is delivered to the client device 506, thereby negatively impacting a user's experience with the electronic document. Further, delays in providing the digital component can result in a failed delivery of the digital component, for example, if the electronic document is no longer presented at the client device 506 when the digital component is provided.

In some implementations, the digital component distribution system 510 is implemented in a distributed computing system that includes, for example, a server and a set of multiple computing devices 514 that are interconnected and identify and distribute digital components in response to requests 512. The set of multiple computing devices 514 operate together to identify a set of digital components that are eligible to be presented in the electronic document from a corpus of millions of available digital components (DC1-x). The millions of available digital components can be indexed, for example, in a digital component database 516. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 512) in order for the digital component to be eligible for presentation. In other words, the distribution parameters are used to trigger distribution (e.g., transmission) of the digital components over the network 502. The distribution parameters can also require that the component request 512 include information specifying a particular geographic region (e.g., country or state) and/or information specifying that the component request 512 originated at a particular type of client device (e.g., mobile device or tablet device) in order for the digital component to be eligible for presentation.

The distribution parameters can also specify an eligibility value (e.g., ranking score, bid, or some other specified value) that is used for evaluating the eligibility of the digital component for distribution/transmission (e.g., among other available digital components), for example, by the component evaluation process. In some situations, the eligibility value can specify a maximum amount of compensation that a provider of the digital component is willing to submit in response to the transmission of the digital component (e.g., for each instance of specific events attributed to the presentation of the digital component, such as user interaction with the digital component).

The identification of the eligible digital component can be segmented into multiple tasks 517a-517c that are then assigned among computing devices within the set of multiple computing devices 514. For example, different computing devices in the set 514 can each analyze a different portion of the digital component database 516 to identify various digital components having distribution parameters that match information included in the component request 512. In some implementations, each given computing device in the set 514 can analyze a different data dimension (or set of dimensions) and pass (e.g., transmit) results (Res 1-Res 3) 518a-518c of the analysis back to the digital component distribution system 510. For example, the results 518a-518c provided by each of the computing devices in the set 514 may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 510 aggregates the results 518a-518c received from the set of multiple computing devices 514 and uses information associated with the aggregated results to: (i) select one or more digital components that will be provided in response to the request 512, and (ii) determine transmission requirements for the one or more digital components. For example, the digital component distribution system 510 can select a set of winning digital components (one or more digital components) based on the outcome of one or more component evaluation processes. In turn, the digital component distribution system 510 can generate and transmit, over the network 502, reply data 520 (e.g., digital data representing a reply) that enables the client device 506 to integrate the set of winning digital components into the given electronic document, such that the set of winning digital components and the content of the electronic document are presented together at a display of the client device 506.

In some implementations, the client device 506 executes instructions included in the reply data 520, which configures and enables the client device 506 to obtain the set of winning digital components from one or more digital component servers. For example, the instructions in the reply data 520 can include a network location (e.g., a Uniform Resource Locator (URL)) and a script that causes the client device 506 to transmit a server request (SR) 521 to the digital component server 508 to obtain a given winning digital component from the digital component server 508. In response to the request, the digital component server 508 will identify the given winning digital component specified in the server request 521 (e.g., within a database storing multiple digital components) and transmit, to the client device 506, digital component data (DC Data) 522 that presents the given winning digital component in the electronic document at the client device 506.

To facilitate searching of electronic documents, the environment 500 can include a search system 550 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 552 (e.g., hardware memory device(s)). Data that are associated with an electronic document is data that represents content included in the electronic document and/or metadata for the electronic document.

Client devices 506 can submit search queries to the search system 550 over the network 502. In response, the search system 550 accesses the search index 552 to identify electronic documents that are relevant to the search query. The search system 550 identifies the electronic documents in the form of search results and returns the search results to the client device 506 in a search results page. A search result is data generated by the search system 550 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 506. In some situations, the search system 550 can be part of, or interact with, an application store (or an online portal) from which applications can be downloaded for install at a client device 506 in order to present information about downloadable applications that are relevant to a submitted search query. Like other electronic documents, search results pages can include one or more slots in which digital components (e.g., advertisements, video clips, audio clips, images, or other digital components) can be presented.

To select a digital component to be transmitted in response to a component request, the distribution system 510 may identify a set of digital components that are eligible to be transmitted in response to the component request. The distribution system 510 may then select one or more of the eligible digital components to be transmitted through, e.g., an auction procedure. In some implementations, the distribution system 510 performs an auction procedure by ranking the eligible digital components in accordance with their respective eligibility values, and selecting one or more highest-ranked digital components to be transmitted in response to the component request.

For example, the distribution system 510 may identify digital components A, B, and C as eligible to be transmitted in response to a component request. In this example, digital component A has an eligibility value of $5, digital component B has an eligibility value of $1, and digital component C has an eligibility value of $5.5, where the eligibility values of the digital components represent bids associated with the digital components. The distribution system 510 may rank (e.g., in descending order) the digital components in accordance with their respective eligibility values as: C, A, B. Finally, the distribution system 510 may select the highest ranked digital component C for transmission in response to the component request After selecting a digital component to be transmitted in response to a digital component request, the distribution system 510 determines a transmission requirement for the selected digital component. A transmission requirement specifies an action to be performed by the provider of a digital component in response to a transmission of the digital component. For example, the transmission requirement may specify that the provider of the digital component submit an amount of compensation in response to the transmission of the digital component. In some cases, the amount of compensation specifies an amount to be submitted for each instance of specific events attributed to the presentation of the digital component (e.g., user interactions with the digital component).

The distribution system 510 may determine the transmission requirement of the selected digital component based on the eligibility value of the selected digital component and/or the eligibility values of the other digital components that were determined as eligible to be transmitted in response to the component request. For example, the distribution system 510 may identify digital components A, B, and C as eligible for transmission in response to a digital component request, where A, B, and C have respective eligibility values of $5, $1, and $5.5. The distribution system 510 may select digital component C for transmission (since it has the highest eligibility value), and may determine the transmission requirement for digital component C to be the next highest eligibility value from amongst the eligibility values of the eligible digital components. In this example, next highest eligibility value is $5 (i.e., the eligibility value of digital component A), and therefore the distribution system 510 may determine the transmission requirement of digital component C to be $5.

Figure 6:
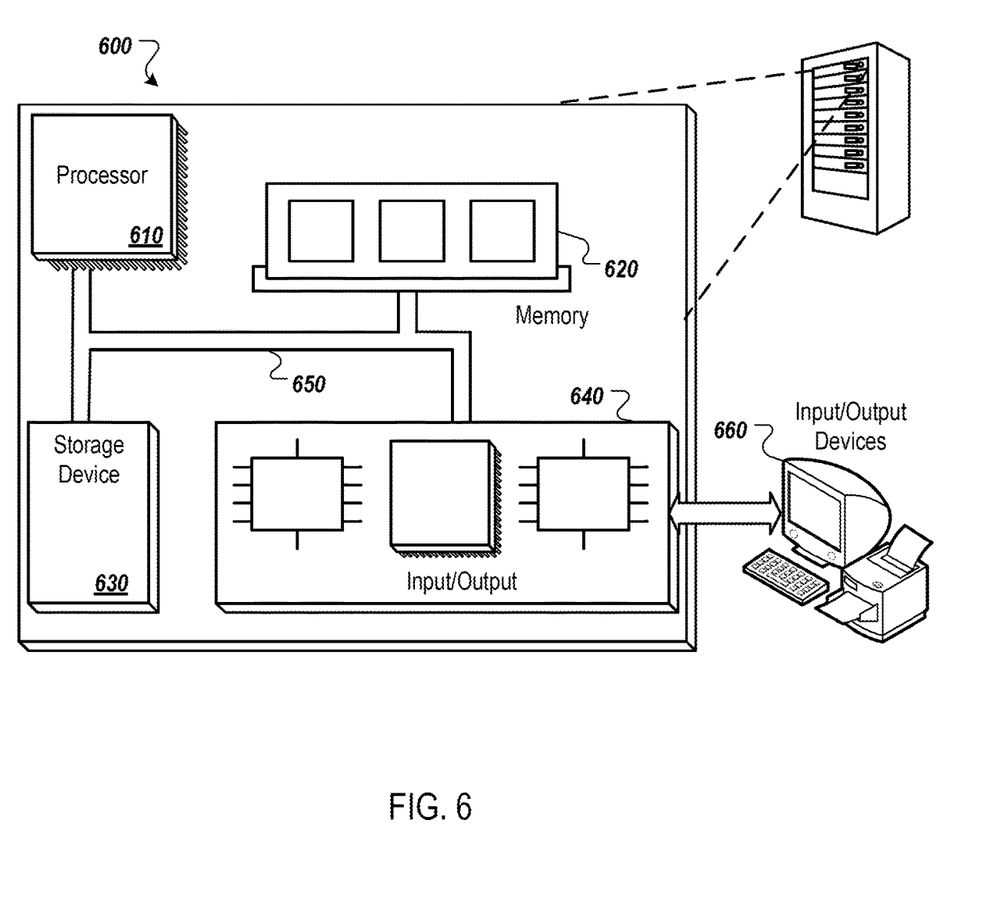
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers (e.g., including one or more processors) in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
  selecting a given digital component from among a plurality of digital components, wherein:
    each digital component of the plurality of digital components has a current scanning priority that defines a current priority for scanning the digital component; and
    the given digital component is selected based on the current scanning priority of the given digital component;
  scanning the given digital component, comprising determining a current state of the given digital component, wherein the current state of the given digital component defines a current compliance status of the given digital component that specifies whether the given digital component currently complies with a policy criterion;
  determining an updated scanning priority of the given digital component based on how frequently the state of the given digital component is predicted to change; and
  re-scanning the given digital component according to the updated scanning priority.

2. The method of claim 1, wherein determining an updated scanning priority of the given digital component based on how frequently the state of the given digital component is predicted to change comprises:
  determining a current context of the given digital component; and
  using a mapping function to map the current context of the given digital component to data defining the updated scanning priority of the given digital component, wherein the mapping function maps the current context of the given digital component to data defining the updated scanning priority of the given digital component based on how frequently the state of the given digital component is predicted to change.

3. The method of claim 2, wherein how frequently the state of the given digital component is predicted to change is determined by processing logged data that characterizes, for each of a plurality of particular digital components: when the particular digital component was scanned, the state of the particular digital component when it was scanned, and the context of the particular digital component when it was scanned.

4. The method of claim 2, wherein the mapping function maps the current context of the given digital component to data defining the updated scanning priority of the given digital component using a likelihood that, based on the current context of the given digital component, the state of the given digital component will change before a next time the given digital component is scanned.

5. The method of claim 2, wherein the mapping function is determined using a local transition probability distribution.

6. The method of claim 2, wherein the current context of the given digital component is based on one or more of: the current state of the given digital component, a current scan index of the given digital component that specifies a number of times the given digital component has been scanned, a number of times that the given digital component has been transmitted for presentation with electronic documents at user devices, and which electronic documents the given digital component has been presented with at the user devices.

7. The method of claim 2, wherein for each of a plurality of possible current contexts, the mapping function defines a mapping from the possible current context to data defining a corresponding scanning priority.

8. The method of claim 2, wherein:
the data defining the updated scanning priority of the given digital component comprises a scaling factor; and
determining the updated scanning priority of the given digital component based on the current context of the given digital component further comprises:
identifying a default scanning priority of the given digital component; and
determining the updated scanning priority of the given digital component as a function of the default scanning priority of the given digital component and the scaling factor.

9. The method of claim 8, wherein the function of the default scanning priority of the given digital component and the scaling factor comprises a product of the default scanning priority of the given digital component and the scaling factor.

10. The method of claim 1, wherein the given digital component specifies a landing page, and scanning the given digital component comprises determining whether the landing page hosts malware.

11. The method of claim 1, wherein the updated scanning priority of the given digital component specifies a waiting time until the given digital component is next scanned.

12. A system comprising:
one or more computers; and
one or more storage devices communicatively coupled to the one or more computers, wherein the one or more storage devices store instructions that, when executed by the one or more computers, cause the one or more computers to perform operations comprising:
selecting a given digital component from among a plurality of digital components, wherein:
each digital component of the plurality of digital components has a current scanning priority that defines a current priority for scanning the digital component; and
the given digital component is selected based on the current scanning priority of the given digital component;
scanning the given digital component, comprising determining a current state of the given digital component, wherein the current state of the given digital component defines a current compliance status of the given digital component that specifies whether the given digital component currently complies with a policy criterion;
determining an updated scanning priority of the given digital component based on how frequently the state of the given digital component is predicted to change; and
re-scanning the given digital component according to the updated scanning priority.

13. The system of claim 12, wherein determining an updated scanning priority of the given digital component based on how frequently the state of the given digital component is predicted to change comprises:
determining a current context of the given digital component; and
using a mapping function to map the current context of the given digital component to data defining the updated scanning priority of the given digital component, wherein the mapping function maps the current context of the given digital component to data defining the updated scanning priority of the given digital component based on how frequently the state of the given digital component is predicted to change.

14. The system of claim 13, wherein how frequently the state of the given digital component is predicted to change is determined by processing logged data that characterizes, for each of a plurality of particular digital components: when the particular digital component was scanned, the state of the particular digital component when it was scanned, and the context of the particular digital component when it was scanned.

15. The system of claim 13, wherein the mapping function maps the current context of the given digital component to data defining the updated scanning priority of the given digital component using a likelihood that, based on the current context of the given digital component, the state of the given digital component will change before a next time the given digital component is scanned.

16. The system of claim 13, wherein the mapping function is determined using a local transition probability distribution.

17. One or more non-transitory computer storage media storing instructions that when executed by one or more computers cause the one or more computers to perform operations comprising:
selecting a given digital component from among a plurality of digital components, wherein:
each digital component of the plurality of digital components has a current scanning priority that defines a current priority for scanning the digital component; and
the given digital component is selected based on the current scanning priority of the given digital component;
scanning the given digital component, comprising determining a current state of the given digital component, wherein the current state of the given digital component defines a current compliance status of the given digital component that specifies whether the given digital component currently complies with a policy criterion;
determining an updated scanning priority of the given digital component based on how frequently the state of the given digital component is predicted to change; and
re-scanning the given digital component according to the updated scanning priority.

18. The non-transitory computer storage media of claim 17, wherein determining an updated scanning priority of the given digital component based on how frequently the state of the given digital component is predicted to change comprises:
determining a current context of the given digital component; and
using a mapping function to map the current context of the given digital component to data defining the updated scanning priority of the given digital component, wherein the mapping function maps the current context of the given digital component to data defining the updated scanning priority of the given digital component based on how frequently the state of the given digital component is predicted to change.

19. The non-transitory computer storage media of claim 18, wherein how frequently the state of the given digital component is predicted to change is determined by processing logged data that characterizes, for each of a plurality of particular digital components: when the particular digital component was scanned, the state of the particular digital component when it was scanned, and the context of the particular digital component when it was scanned.

20. The non-transitory computer storage media of claim 18, wherein the mapping function maps the current context of the given digital component to data defining the updated scanning priority of the given digital component using a likelihood that, based on the current context of the given digital component, the state of the given digital component will change before a next time the given digital component is scanned.

* * * * *